(12) United States Patent
Cho et al.

(10) Patent No.: US 11,710,992 B2
(45) Date of Patent: Jul. 25, 2023

(54) MOTOR AND COMPRESSOR INCLUDING THE SAME

(71) Applicant: SAMSUNG ELECTRONICS CO., LTD., Suwon-si (KR)

(72) Inventors: Jinwoo Cho, Suwon-si (KR); Hongseok Kim, Suwon-si (KR); Jae-Woo Park, Suwon-si (KR); Ui-Yoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 16/918,556

(22) Filed: Jul. 1, 2020

(65) Prior Publication Data
US 2021/0006103 A1    Jan. 7, 2021

(30) Foreign Application Priority Data

Jul. 2, 2019    (KR) .................. 10-2019-0079665
Nov. 20, 2019    (KR) .................. 10-2019-0149492

(51) Int. Cl.
*H02K 1/18*    (2006.01)
*F25B 31/02*    (2006.01)

(52) U.S. Cl.
CPC .......... *H02K 1/185* (2013.01); *F25B 31/026* (2013.01)

(58) Field of Classification Search
CPC .. H02K 1/185; H02K 5/1675; H02K 2213/03; H02K 1/146; H02K 5/15;
(Continued)

(56) References Cited

U.S. PATENT DOCUMENTS 2,774,897 A * 12/1956 Matthews .............. B23K 11/14
                                                    310/216.049
6,836,051 B2 * 12/2004 Hiwaki .................. H02K 1/185
                                                      310/254.1
(Continued)

FOREIGN PATENT DOCUMENTS

EP    3 220 513 A1    9/2017
JP    2005-80451    3/2005
(Continued)

OTHER PUBLICATIONS

International Search Report dated Oct. 27, 2020 in International Patent Application No. PCT/KR2020/008249.
(Continued)

*Primary Examiner* — John K Kim
(74) *Attorney, Agent, or Firm* — Staas & Halsey LLP

(57) ABSTRACT

A compressor including a housing, and a motor including a stator to be interference fitted into and fixed to an inner circumferential surface of the housing and a rotor rotatable inside the stator. The stator includes an annular back yoke disposed inside the housing, a plurality of teeth extending radially inward from the back yoke, and a coil wound on the plurality of teeth. The back yoke includes a deformation portion compressed and deformed by the housing while the stator is interference fitted into the inner circumferential surface of the housing, a contact portion which protrudes radially outward from the deformation portion and being in contact with the housing, and a cavity formed on a radial inner side of the deformation portion into which the deformation portion is deformed.

5 Claims, 18 Drawing Sheets

(58) Field of Classification Search
CPC . H02K 7/085; H02K 7/14; H02K 1/14; F25B 31/026; F04C 29/0085; F04C 18/0215; F04C 18/3564; F04C 2240/40; F04C 23/001; F04C 23/008; F04C 23/02
USPC .................................................. 310/216.135
See application file for complete search history.

(56) References Cited

U.S. PATENT DOCUMENTS

| | | | | |
|---|---|---|---|---|
| 2010/0007236 | A1* | 1/2010 | Sano | H02K 1/148 |
| | | | | 310/216.135 |
| 2013/0342068 | A1* | 12/2013 | Ogawa | H02K 1/12 |
| | | | | 310/216.001 |
| 2016/0190877 | A1* | 6/2016 | Li | H02K 1/185 |
| | | | | 310/156.01 |
| 2016/0241092 | A1* | 8/2016 | Nigo | F04C 18/344 |
| 2021/0006103 | A1* | 1/2021 | Cho | H02K 1/185 |

FOREIGN PATENT DOCUMENTS

| | | |
|---|---|---|
| JP | 2006-271105 | 10/2006 |
| JP | 2006-333657 | 12/2006 |
| JP | 2007-49842 | 2/2007 |
| JP | 2010-093960 | 4/2010 |
| JP | 2013-169042 | 8/2013 |
| JP | WO2014/128938 A1 | 8/2014 |
| JP | 2016-129463 | 7/2016 |
| JP | 2019-13145 A | 1/2019 |
| KR | 10-0572186 | 4/2006 |
| KR | 10-1166306 | 7/2012 |

OTHER PUBLICATIONS

Extended European Search Report dated Feb. 15, 2022 in European Patent Application No. 20835483.7 (8 pages).

* cited by examiner

MOTOR AND COMPRESSOR INCLUDING THE SAME

CROSS-REFERENCE TO RELATED APPLICATION(S)

This application is based on and claims priority under 35 U.S.C. § 119 to Korean Patent Application Nos. 10-2019-0079665, filed on Jul. 2, 2019, and 10-2019-0149492, filed on Nov. 20, 2019, in the Korean Intellectual Property Office, the disclosures of which are incorporated by reference herein in their entireties.

BACKGROUND

1. Field

The disclosure relates to a compressor used in an air conditioner, a clothes dryer, and the like, and a motor included therein.

2. Description of the Related Art

In general, a compressor is a mechanical apparatus that receives power from a power generating apparatus such as an electric motor and a turbine and compresses air, refrigerant, or other various working gases to increase a pressure thereof. Compressors are widely used throughout household appliances such as a refrigerator, an air conditioner and a clothes dryer, or industries.

Compressors include a reciprocating compressor, a scroll compressor, and a rotary compressor. The reciprocating compressor having a compression space into and from which a working gas is introduced and discharged, between a piston and a cylinder compresses the working gas as the piston reciprocates linearly inside the cylinder. The scroll compressor having a compression space into and from which a working gas is introduced and discharged, between an orbiting scroll and a fixed scroll compresses the working gas as the orbiting scroll rotates along the fixed scroll. The rotary compressor having a compression space into and from which a working gas is introduced and discharged, between an eccentrically rotating rolling piston and a piston compresses the working gas as the rolling piston rotates eccentrically along an inner wall of the cylinder.

The scroll compressor and rotary compressor include a motor for generating a rotational motion. The motor includes a stator and a rotor rotating inside the stator. Because the stator is interference fitted into a housing of a compressor, a compressive stress occurs on the stator by the housing. The compressive stress occurring on the stator may degrade the electromagnetic properties of the stator.

SUMMARY

In accordance with an aspect of the disclosure, a compressor includes a housing, and a motor including a stator interference fitted into and fixed to an inner circumferential surface of the housing and a rotor rotating inside the stator. The stator includes an annular back yoke disposed inside the housing, a plurality of teeth extending radially inward from the back yoke, and a coil wound on the plurality of teeth. The back yoke includes a deformation portion compressed and deformed by the housing, a contact portion protruding radially outward from the deformation portion and being in contact with the housing, and a cavity formed on a radial inner side of the deformation portion and providing a space in which the deformation portion is deformed.

The deformation portion may include a cantilever. The contact portion may be formed on an end of the cantilever.

The back yoke may include one of the deformation portion, one of the contact portion, and one of the cavity, for each of the plurality of teeth.

The back yoke may include two of the deformation portions, two of the contact portions, and two of the cavities for each of the plurality of teeth, which are arranged symmetrically with respect to the center of each of the plurality of teeth.

The deformation portion may include a fixed end support beam. The contact portion may be disposed at a central portion of the deformation portion.

A plurality of the contact portions may be provided, and the plurality of contact portions may be arranged symmetrically with respect to the center of the deformation portion.

The back yoke may include one of the deformation portion, one of the contact portion, and one of the cavity, for each of the plurality of teeth.

The deformation portion may be disposed such that the center of the deformation portion coincides with the center of each of the plurality of teeth.

The cavity may be configured such that a central portion of the deformation portion is disposed at a central portion of the cavity.

The cavity may have a radial width larger than a difference between an outer diameter of the stator and an inner diameter of the housing.

The cavity may have a radial width larger than a protruding width of the contact portion.

The contact portion may have a circumferential width larger than a thickness of the housing.

The sum of circumferential widths of two of the contact portions arranged symmetrically with respect to the center of each of the plurality of teeth may be larger than a thickness of the housing.

The sum of circumferential widths of the plurality of contact portions may be larger than a thickness of the housing.

The back yoke may include the deformed portion, the contact portion, and the cavity, for some of the plurality of teeth.

In accordance with another aspect of the disclosure, a compressor includes a housing, and a motor interference fitted into and fixed to an inner circumferential surface of the housing. The motor includes a deformation portion compressed and deformed by coupling with the housing, and a cavity formed on a radial inner side of the deformation portion and providing a space in which the deformation portion is to be deformed.

The motor may further include a contact portion protruding radially outward from the deformation portion and being in contact with the housing. The cavity may have a radial width larger than a protruding width of the contact portion.

Circumferential widths of the contact portion and a contact surface of the housing may be larger than a radial thickness of the housing.

In accordance with another aspect of the disclosure; a motor includes an annular back yoke, a plurality of teeth extending from the back yoke, and a stress absorber provided on the side opposite to one side of the back yoke from which the plurality of teeth extends. Each of the plurality of teeth includes a deformation portion configured to be compressed and deformed, a cavity providing a space in which the deformation portion is deformed, and a contact portion protruding from the side opposite to one side of the deformation portion in which the cavity is disposed and pressing the deformation portion by an external force.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions. In order to clearly illustrate the disclosure, parts not related to the description are omitted from the drawings, and the size of the components may be slightly exaggerated to facilitate understanding.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component.

In the present specification, a rotary compressor is described for convenience of description, but is not limited thereto. Hereinafter, embodiments of the disclosure will be described in detail with reference to the accompanying drawings.

It is an aspect of the disclosure to provide a compressor capable of reducing a compressive stress occurring on a stator to prevent the efficiency of a motor from being lowered.

Figure 1:
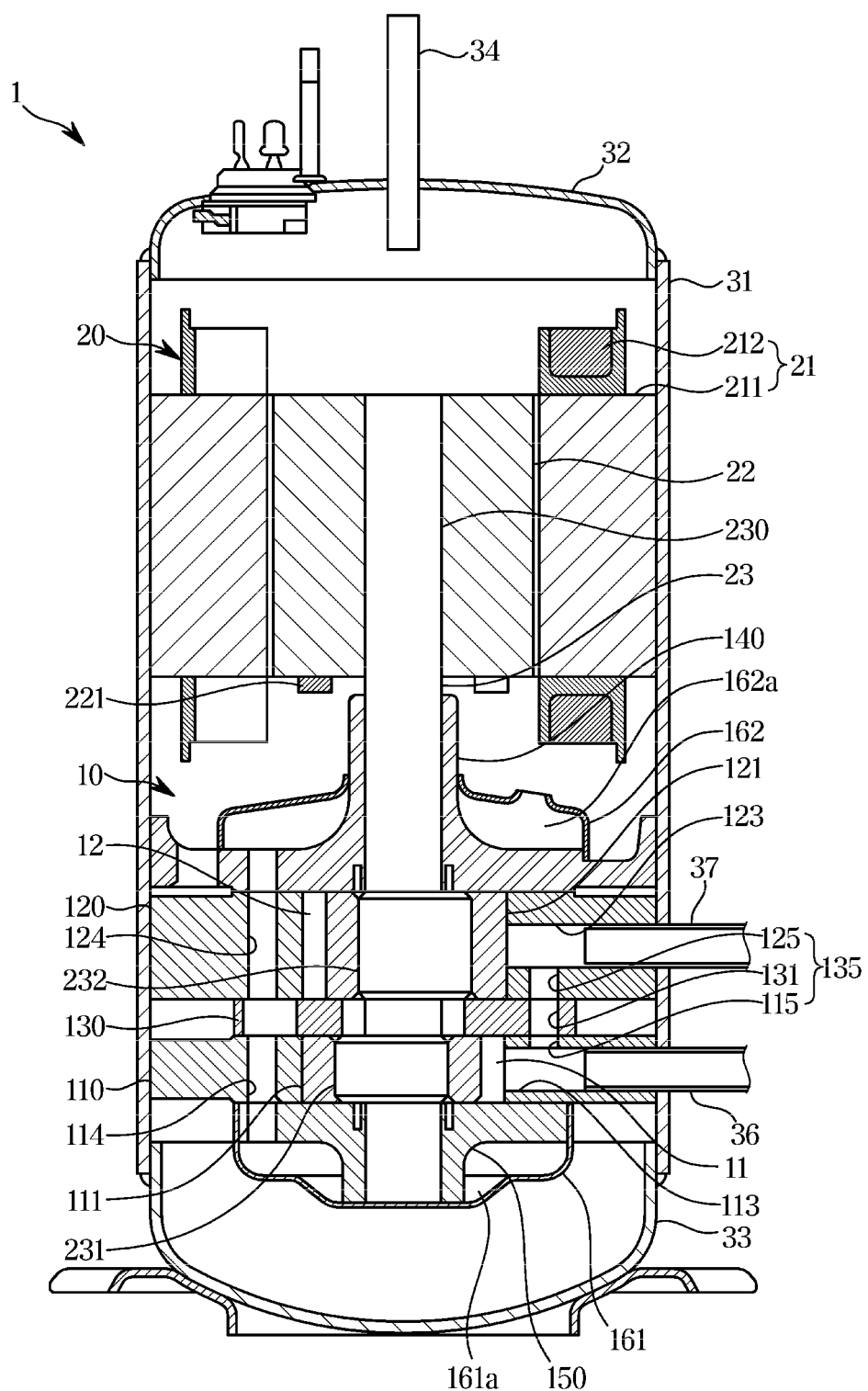
FIG. 1 is an axial cross-sectional view of a compressor according to an embodiment of the disclosure.
Figure 2:
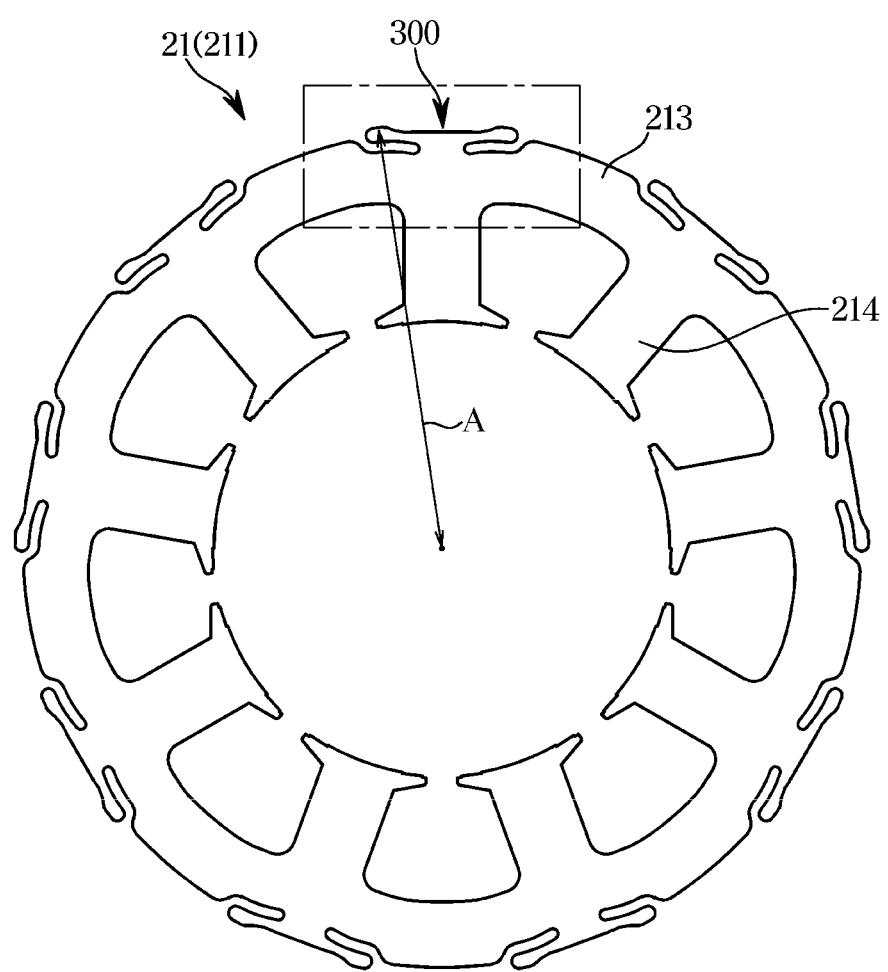
FIG. 2 is a plan view of a stator of a motor of the compressor according to an embodiment of the disclosure.
Figure 3:
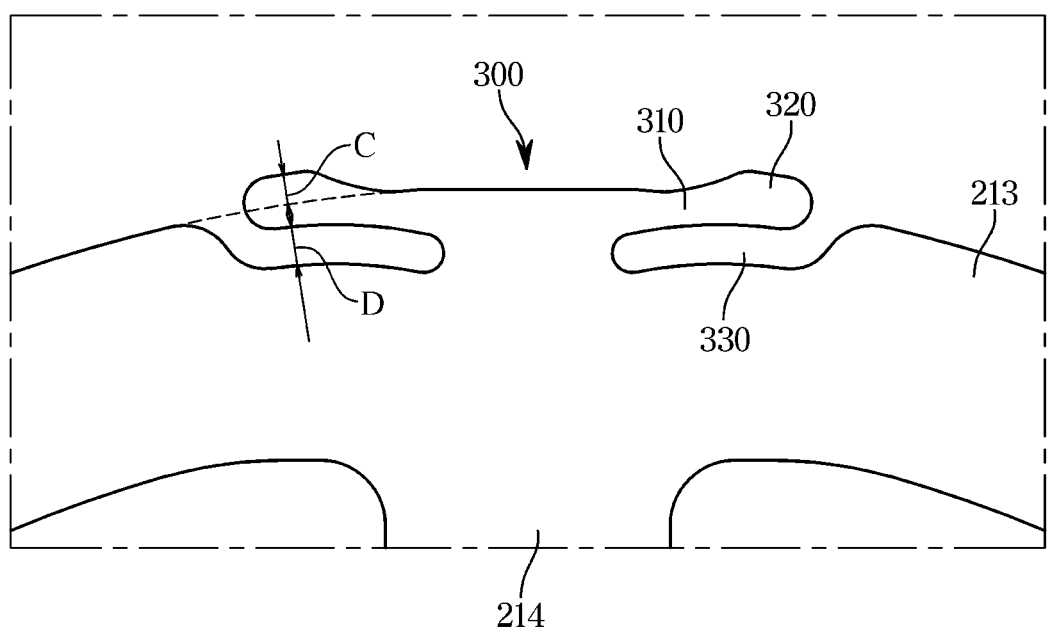
FIG. 3 is an enlarged view of a portion of the stator in FIG. 2.
Figure 4:
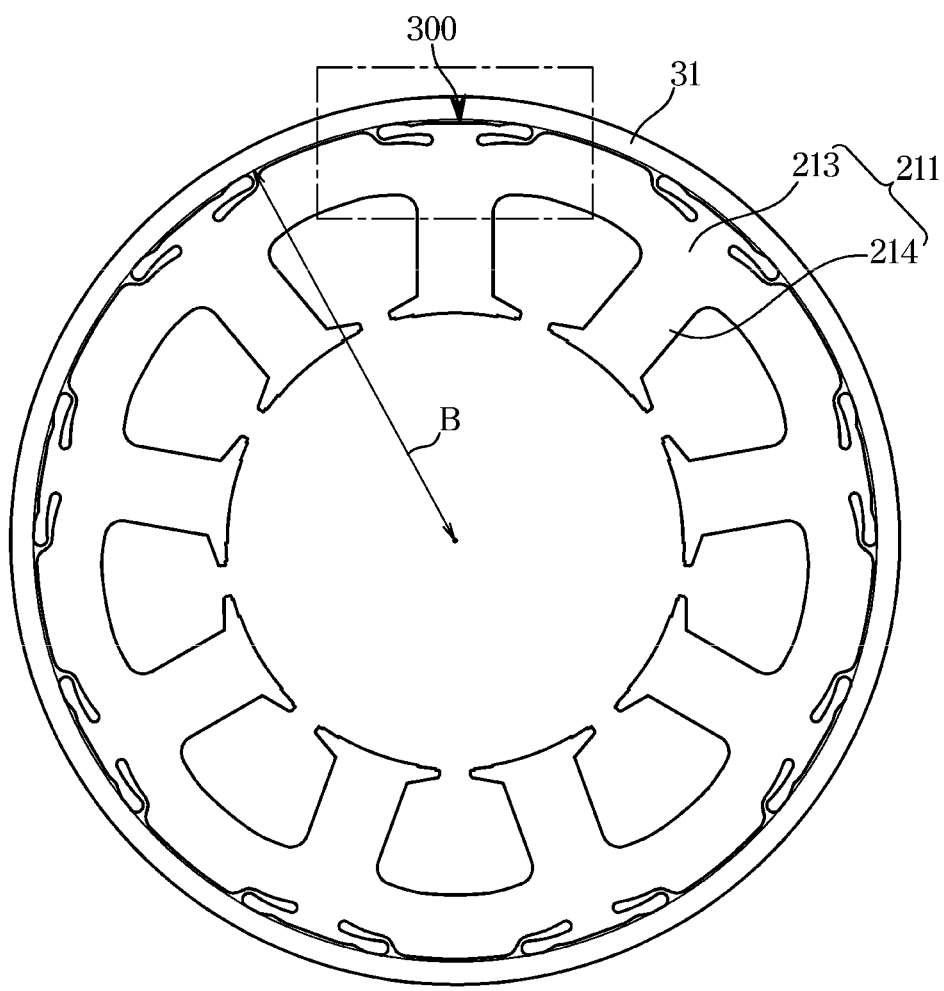
FIG. 4 is a plan view of a state in which the stator in FIG. 2 is coupled to a housing.
Figure 5:
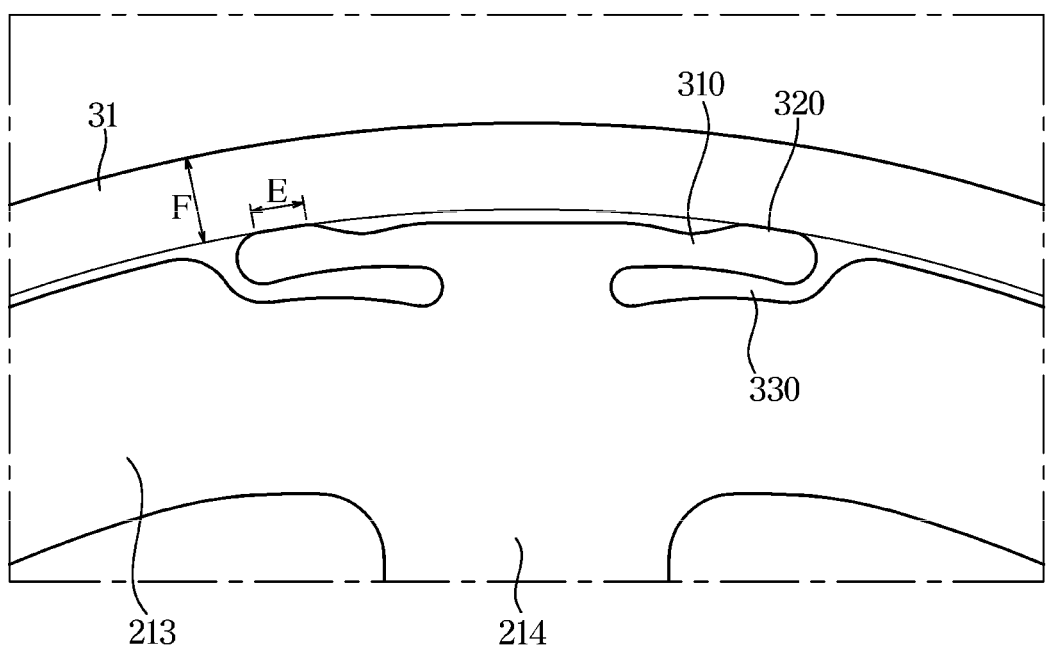
FIG. 5 is an enlarged view of a portion of the stator and the housing in FIG. 4.

FIG. 1 is an axial cross-sectional view of a compressor according to an embodiment of the disclosure, FIG. 2 is a plan view of a stator of a motor of the compressor according to an embodiment of the disclosure, FIG. 3 is an enlarged view of a portion of the stator in FIG. 2, FIG. 4 is a plan view of a state in which the stator in FIG. 2 is coupled to a housing, and FIG. 5 is an enlarged view of a portion of the stator and the housing in FIG. 4.

Referring to FIG. 1, a compressor 1 includes a compression unit 10 for compressing a refrigerant, a motor 20 for driving the compression unit, and a housing 31 for accommodating the compression unit 10 and the motor 20. The compressor 1 may be configured such that an axial direction of a rotating shaft 23 of the motor 20 becomes the gravity direction. Hereinafter, the axial direction of the rotating shaft 23 is referred to as an up-down direction, and the up-down direction is defined as shown in FIG. 1.

The motor 20 may be fixed to the housing 31 above the compression unit 10. The motor 20 may be interference fitted into and fixed to an inner circumferential surface of the housing 31. The motor 20 may include a stator 21 interference fitted into and fixed to the inner circumferential surface of the housing 31 and a rotor 22 configured to rotate inside the stator 21. The rotating shaft 23 is fixed to the rotor 22 to rotate together with the rotation of the rotor 22.

The compressor 1 may include a cylindrical housing 31 disposed at a central portion in the up-down direction, an upper cover 32 covering an upper opening of the housing 31, and a lower cover 33 covering a lower opening of the housing 31.

The stator 21 may include a core 211 and a coil 212 wound on the core 211. The core 211 may be formed by stacking a plurality of electrical steel sheets. The electric steel sheet is substantially annular, and the core 211 is substantially cylindrical. An outer diameter A (see FIG. 2) of the core 211 is larger than an inner diameter B (see FIG. 4) of the housing 31, and the core 211 may be interference fitted into and coupled to the housing 31. Methods of fitting the core 211 into the housing 31 include shrinkage fit and press fitting. In general, the press fitting is a method of heating the housing 31 to a certain temperature or more and pushing the core 211 inside the housing 31.

The rotor 22 may be formed by stacking a plurality of electrical steel sheets. The electric steel sheet is substantially annular, and the rotor 22 is substantially cylindrical. An inner diameter of the rotor 22 is smaller than an outer diameter of the rotating shaft 23, and the rotating shaft 23 may be interference fitted into and coupled to the rotor 22. An outer diameter of the rotor 22 is smaller than an inner diameter of the core 211 of the stator 21, and there is a gap between the rotor 22 and the stator 21. A compression unit side balancer 221 may be disposed on a bottom surface of the rotor 22.

The rotating shaft 23 includes a shaft body 230 to which the rotor 22 is fitted, and a first eccentric shaft 231 and a second eccentric shaft 232 installed at a lower portion of the shaft body 230 and having axial centers eccentric from an axial center of the shaft body 230. The first eccentric shaft 231 and the second eccentric shaft 232 may be arranged to have a phase difference of 180 degrees in a circumferential direction of the rotating shaft 23. A portion of the shaft body 230 below the rotor 22 is rotatably supported by a main bearing 140, and a lower end of the shaft body 230 is rotatably supported by a sub bearing 150.

The compressor 1 may include a discharge part 34 for discharging a high-pressure refrigerant gas compressed in the compression unit 10 to the outside of the compressor 1, a first suction pipe 36 and a second suction pipe 37 for sucking a refrigerant gas from the outside of the compressor 1.

The stator 21 of the motor 20 and the main bearing 140 may be fixed to the housing 31. The compressor 1 may include a first suction pipe 36 and a second suction pipe 37 inserted into through holes formed on the housing 31 to suck a refrigerant gas from the outside of the compressor 1. The upper cover 32 may be formed in an upside-down bowl shape. The compressor 1 may include a discharge part 34 inserted into a through hole formed at the top of the upper cover 32 to discharge the high-pressure refrigerant gas compressed in the compression unit 10 to the outside of the compressor 1. The lower cover 33 may be formed in a bowl shape. The upper cover 32 and the lower cover 33 may be fixed to the housing 31.

The compression unit 10 may include a first cylinder 110, a second cylinder 120, and a disk-shaped partition 130 partitioning the first cylinder 110 and the second cylinder 120. The compression unit 10 is disposed above the second cylinder 120 to cover the second cylinder 120 and may include the main bearing 140 rotatably supporting the rotating shaft 23. The compression unit 10 is disposed below the first cylinder 110 to cover the first cylinder 110 and may include the sub bearing 150 rotatably supporting the rotating shaft 23. The main bearing 140 may be fixed to the housing 31 by welding or the like. The sub bearing 150 may be fixed to the main bearing 140 by fastening members such as bolts.

The compression unit 10 may include a first cover 161 forming a first discharge chamber 161a together with the sub bearing 150, and a second cover 162 forming a second discharge chamber 162a together with the main bearing 140. The compression unit 10 may include a first operation chamber 11 formed by the first cylinder 110, the partition 130, and the sub bearing 150, and a second operation chamber 12 formed by the second cylinder 120, the partition 130, and the main bearing 140.

The compression unit 10 may include a first piston 111 into which the first eccentric shaft 231 of the rotating shaft 23 is inserted and rotating with the rotating shaft 23 in the first operation chamber 11, and a second piston 121 into which the second eccentric shaft 232 of the rotating shaft 23 is inserted and rotating with the rotating shaft 23 in the second operation chamber 12.

The first cylinder 110 is provided with a first suction passage 113 penetrating in a direction (radial direction) orthogonal to the axial direction of the rotating shaft 23 to communicate the first operation chamber 11 with the outside of the first cylinder 110. The first cylinder 110 is also provided with a first discharge gas passage 114 penetrating in the axial direction of the rotating shaft 23 from the outside of the first operation chamber 11.

The second cylinder 120 is provided with a second suction passage 123 penetrating in a direction (radial direction) orthogonal to the axial direction of the rotating shaft 23 to communicate the second operation chamber 12 with the outside of the second cylinder 120. The second cylinder 120 is also provided with a second discharge gas passage 124 penetrating in the axial direction of the rotating shaft 23 from the outside of the second operation chamber 12.

The compression unit 10 includes the first suction pipe 36 having one end inserted into the first suction passage 113 and the other end connected to an accumulator, and the second suction pipe 37 having one end inserted into the second suction passage 123 and the other end connected to the accumulator. The compression unit 10 includes a communication passage 135 communicating the first suction passage 113 and the second suction passage 123. The communication passage 135 includes a partition through hole 131 formed in the axial direction on the partition 130, a first through hole 115 formed on the first cylinder 110 to communicate the partition through hole 131 with the first suction passage 113, and a second through hole 125 formed on the second cylinder 120 to communicate the partition through hole 131 with the second suction passage 123.

Referring to FIGS. 1 to 5, the core 211 of the stator 21 may include an annular back yoke 213 in contact with the housing 31, and a tooth 214 extending inward from the back yoke 213. The core 211 may include a plurality of the teeth 214 formed in a circumferential direction on an inner portion thereof facing an outer circumferential surface of the rotor 22. The coil 212 may be wound on the teeth 214 of the core 211.

The motor 20 may include a stress absorber 300 provided on the back yoke 213 of the core 211 of the stator 21. The stress absorber 300 may be provided on the side opposite to one side of the back yoke 213 from which the tooth 214 extends. The motor 20 may include a plurality of the stress absorbers 300 corresponding to the plurality of teeth 214.

The stress absorber 300 is configured to absorb a compressive stress transmitted from the housing 31 to the stator 21 by coupling with the housing 31. The stress absorber 300 may include at least one deformation portion 310, at least one contact portion 320, and at least one cavity 330. The deformation portion 310 is configured to be compressed and deformed by the housing 31 when the stator 21 is interference fitted into and coupled to the housing 31. The cavity 330 is formed in a radial inside of the deformation portion 310 to provide a space in which the deformation portion 310 may be deformed.

The contact portion 320 protrudes radially outward from the deformation portion 310. The contact portion 320 is configured to come into contact with an inner surface of the housing 31 when the stator 21 is coupled to the housing 31. The housing 31 presses the contact portion 320 of the stator 21 when the motor 20 is interference fitted into and coupled to the housing 31. When the housing 31 presses the contact portion 320, the deformation portion 310 is deformed to the cavity 330 side together with the contact portion 320. On the deformation portion 310 where deformation occurs, stress occurs and a restoring force to return to the original state is generated. Therefore, the stator 21 is coupled and fixed to the housing 31. Further, because all coupling forces are applied to the deformable portion 310, little stress occurs on the back yoke 213 that is not in contact with the housing 31. Therefore, the electromagnetic characteristics of the motor 20 are not lowered.

The contact portion 320 protrudes radially outward compared to the portion of the back yoke 213 where the stress absorber 300 is not formed, and a width C in which the contact portion 320 protrudes radially outward from the deformation portion 310 is larger than a difference between an outer radius A of the stator 21 and an inner radius B of the housing 31. Therefore, when the stator 211 is coupled to the housing 31, the housing 31 does not press other portion of the core 211 except for the stress absorber 300 of the stator 21.

The deformation portion 310 is deformed to the cavity 330 side by the difference between the outer radius A of the stator 21 and the inner radius B of the housing 31. The cavity 330 has a width D larger than the difference between the outer radius A of the stator 21 and the inner radius B of the housing 31. Therefore, even when the deformation portion 310 is deformed to the cavity 330 side, the deformation portion 310 does not press a portion of the back yoke 213 on a radial inner side of the cavity 330.

The contact portion 320 may protrude to have the width C sufficiently larger than the difference between the outer radius A of the stator 21 and the inner radius B of the housing 31. Therefore, even when a tolerance of the inner radius B of the housing 31 or a tolerance of the outer radius A of the stator 21 occurs, the housing 31 does not press other portion of the core 211 except for the stress absorber 300 of the stator 21.

The cavity 330 may have a sufficiently large radial width D compared to the protruding width C of the contact portion 320. Therefore, even when a tolerance of the protruding width C of the contact portion 320, a tolerance of the inner radius B of the housing 31, or a tolerance of the outer radius A of the stator 21 occurs, the deformation portion 310 does not press the portion of the back yoke 213 on the radial inner side of the cavity 330.

The deformation portion 310 may be formed in a cantilever shape. The cavity 330 may be provided such that a central portion of the deformation portion 310 is disposed at a central portion of the cavity 330. The contact portion 320 may be provided to protrude radially outward from a cantilever end of the deformation portion 310. The core 211 of the stator 21 may include a plurality of the stress absorbers 300 corresponding to the plurality of teeth 214. Each of the stress absorbers 300 may be disposed on a radial outer side of each of the teeth 214.

Each of the stress absorbers 300 may include the at least one deformation portion 310, the at least one contact portion 320, and the at least one cavity 336. The back yoke 213 may include two of the deformation portions 310, two of the contact portions 320, and two of the cavities 330, which are symmetrically disposed with respect to the center of each of the teeth 214 for each of the teeth 214. The deformation portions 310 may be formed in a cantilever shape extending outwardly from the center of the teeth 214.

The contact portion 320 may be formed to come into surface contact with the inner surface of the housing 31 when the deformation portion 310 is deformed. When the deformation portion 310 is formed in a cantilever shape, the contact portion 320 may be formed to protrude higher toward the cantilever end.

A circumferential width of a contact surface in which the at least one contact portion 320 included in one of the stress absorber 300 is in contact with the housing 31 may be larger than a radial thickness F of the housing 31. When the circumferential width of the contact surface is large, the stator 21 may be more stably fixed to the inner surface of the housing 31.

When one of the stress absorber 300 includes two of the contact portions 320, the sum of the circumferential widths E of the contact portions 320 and the contact surface of the housing 31 may be larger than the radial thickness F of the housing 31. That is, when two of the contact portions 320 are disposed with respect to the center of each of the teeth 214, each of the contact portions 320 may have a contact surface of the circumferential width E exceeding half of the radial thickness F of the housing 31.

Figure 6:
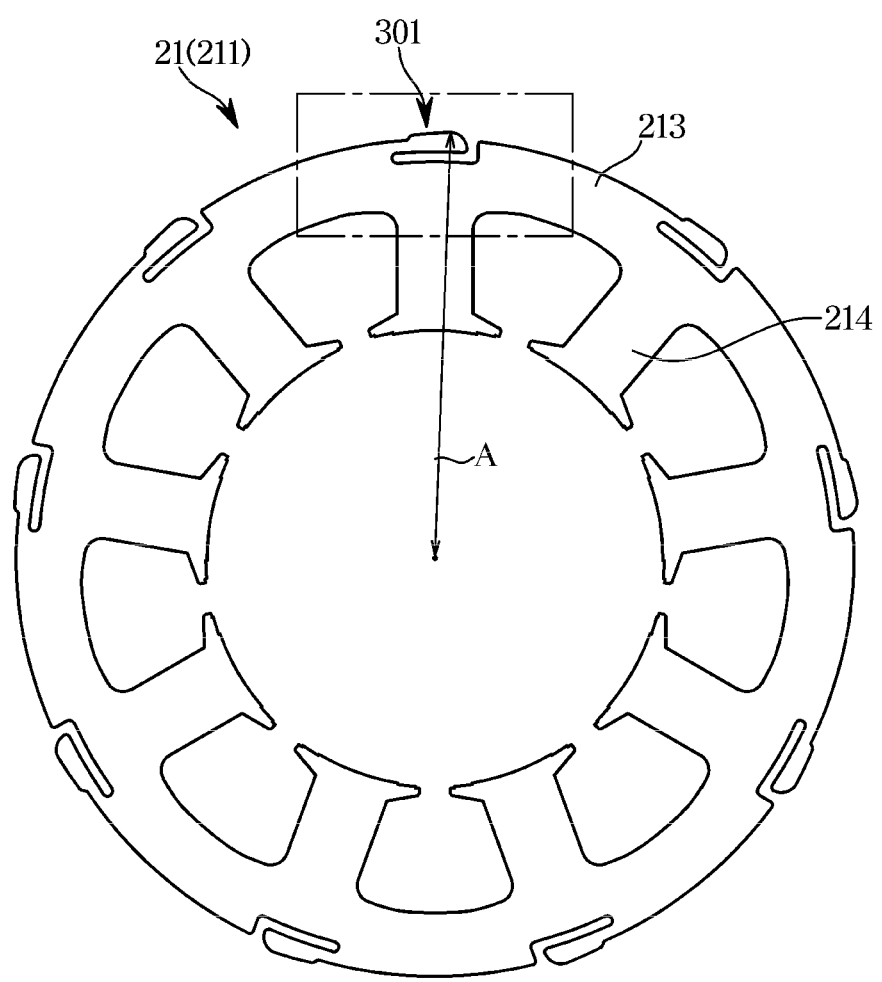
FIG. 6 is a plan view of a stator of a motor of a compressor according to another embodiment of the disclosure.
Figure 7:
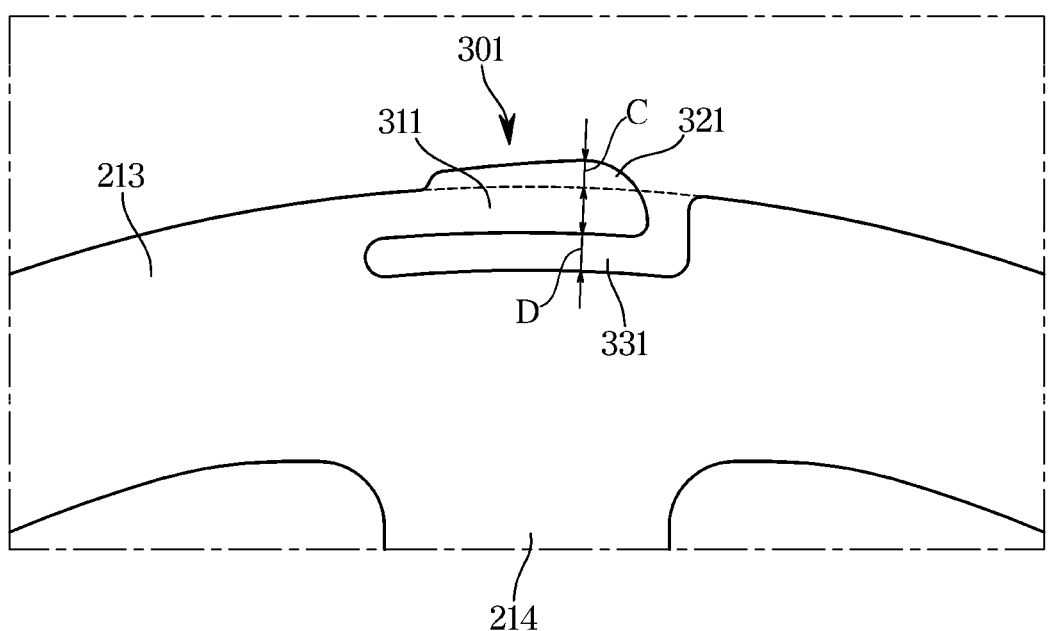
FIG. 7 is an enlarged view of a portion of the stator in FIG. 6.
Figure 8:
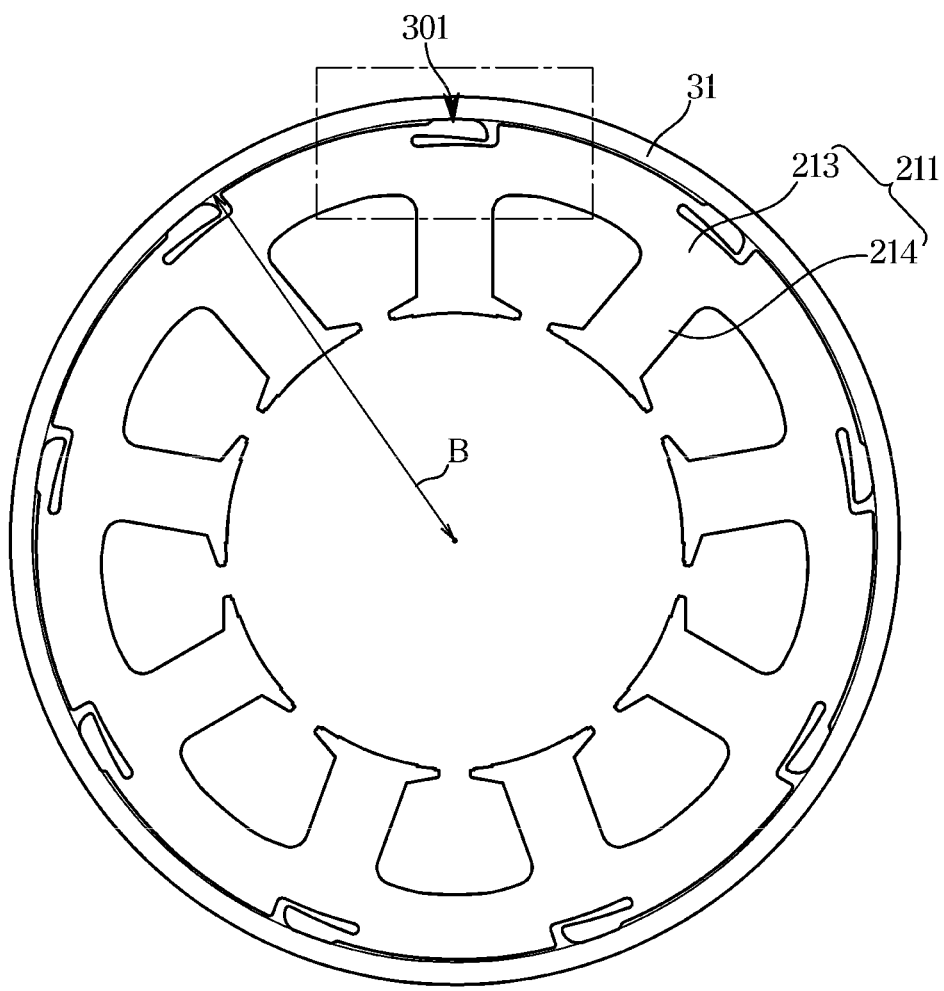
FIG. 8 is a plan view of a state in which the stator in FIG. 6 is coupled to a housing.
Figure 9:
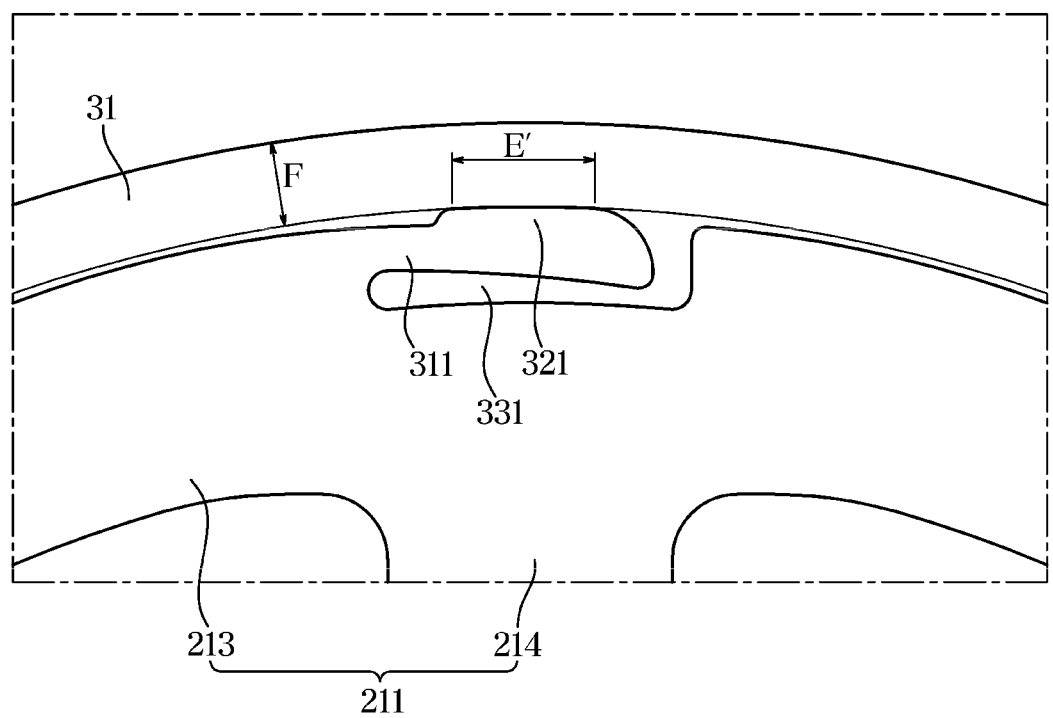
FIG. 9 is an enlarged view of a portion of the stator and the housing in FIG. 8.

FIG. 6 is a plan view of a stator of a motor of a compressor according to another embodiment of the disclosure, FIG. 7 is an enlarged view of a portion of the stator in FIG. 6, FIG. 8 is a plan view of a state in which the stator in FIG. 6 is coupled to a housing, and FIG. 9 is an enlarged view of a portion of the stator and the housing in FIG. 8.

Referring to FIGS. 6 to 8, the core 211 of the stator 21 may include the annular back yoke 213 in contact with the housing 31, and the teeth 214 extending inward from the back yoke 213. The core 211 may include a plurality of teeth 214 in the circumferential direction on the inner portion thereof facing the outer circumferential surface of the rotor 22. The coil 212 may be wound on the teeth 214 of the core 211.

The motor 20 may include a stress absorber 301 provided on the back yoke 213 of the core 211 of the stator 21. The stress absorber 301 may be provided on the side opposite to one side of the back yoke 213 from which the tooth 214 extends. The motor 20 may include a plurality of the stress absorbers 301 corresponding to the plurality of teeth 214.

The stress absorber 301 is configured to absorb a compressive stress transmitted from the housing 31 to the stator 21 by coupling with the housing 31. The stress absorber 301 may include at least one deformation portion 311, at least one contact portion 321, and at least one cavity 331. The deformation portion 311 is configured to be compressed and deformed by the housing 31 when the stator 21 is interference fitted into and coupled to the housing 31. The cavity 331 is formed in a radial inside of the deformation portion 311 to provide a space in which the deformation portion 311 may be deformed.

The contact portion 321 protrudes radially outward from the deformation portion 311. The contact portion 321 is configured to come into contact with the inner surface of the housing 31 when the stator 21 is coupled to the housing 31. The housing 31 presses the contact portion 321 of the stator 21 when the motor 20 is interference fitted into and coupled to the housing 31. When the housing 31 presses the contact portion 321, the deformation portion 311 is deformed to the cavity 330 side together with the contact portion 321.

The contact portion 321 protrudes radially outward compared to the portion of the back yoke 213 where the stress absorber 301 is not formed, and the width C in which the contact portion 321 protrudes radially outward from the deformation portion 311 is larger than the difference between the outer radius A of the stator 21 and the inner radius B of the housing 31. Therefore, when the stator 211 is coupled to the housing 31, the housing 31 does not press other portion of the core 211 except for the stress absorber 301 of the stator 21.

The deformation portion 311 is deformed to the cavity 331 side by the difference between the outer radius A of the stator 21 and the inner radius B of the housing 31. The cavity 331 has the width D larger than the difference between the outer radius A of the stator 21 and the inner radius B of the housing 31. Therefore, even when the deformation portion 311 is deformed to the cavity 331 side, the deformation portion 311 does not press a portion of the back yoke 213 on a radial inner side of the cavity 331.

The contact portion 321 may protrude to have the width C sufficiently larger than the difference between the outer radius A of the stator 21 and the inner radius B of the housing 31. Therefore, even when a tolerance of the inner radius B of the housing 31 or a tolerance of the outer radius A of the stator 21 occurs, the housing 31 does not press other portion of the core 211 except for the stress absorber 301 of the stator 21.

The cavity 331 may have the sufficiently large radial width D compared to the protruding width C of the contact portion 321. Therefore, even when a tolerance of the protruding width C of the contact portion 321, a tolerance of the inner radius B of the housing 31, or a tolerance of the outer radius A of the stator 21 occurs, the deformation portion 311 does not press the portion of the back yoke 213 on the radial inner side of the cavity 331.

The deformation portion 311 may be formed in a cantilever shape. The cavity 331 may be provided such that a central portion of the deformation portion 311 is disposed at a central portion of the cavity 331. The contact portion 321 may be provided to protrude radially outward from a cantilever end of the deformation portion 311. The core 211 of the stator 21 may include a plurality of the stress absorbers 301 corresponding to the plurality of teeth 214. Each of the stress absorbers 301 may be disposed on a radial outer side of each of the teeth 214.

The contact portion 321 may be formed to come into surface contact with the inner surface of the housing 31 when the deformation portion 311 is deformed. When the deformation portion 311 is formed in a cantilever shape, the contact portion 321 may be formed to protrude higher toward the cantilever end.

Each of the stress absorbers 301 may include the at least one deformation portion 311, the at least one contact portion 321, and the at least one cavity 331. The back yoke 213 may include one of the deformation portion 311, one of the contact portion 321, and one of the cavity 331 for each of the teeth 214.

A circumferential width E' of a contact surface in which the contact portion 321 included in the stress absorber 301 is in contact with the housing 31 may be larger than the radial thickness F of the housing 31. When the circumferential width of the contact surface is large, the stator 21 may be more stably fixed to the inner surface of the housing 31.

Figure 10:
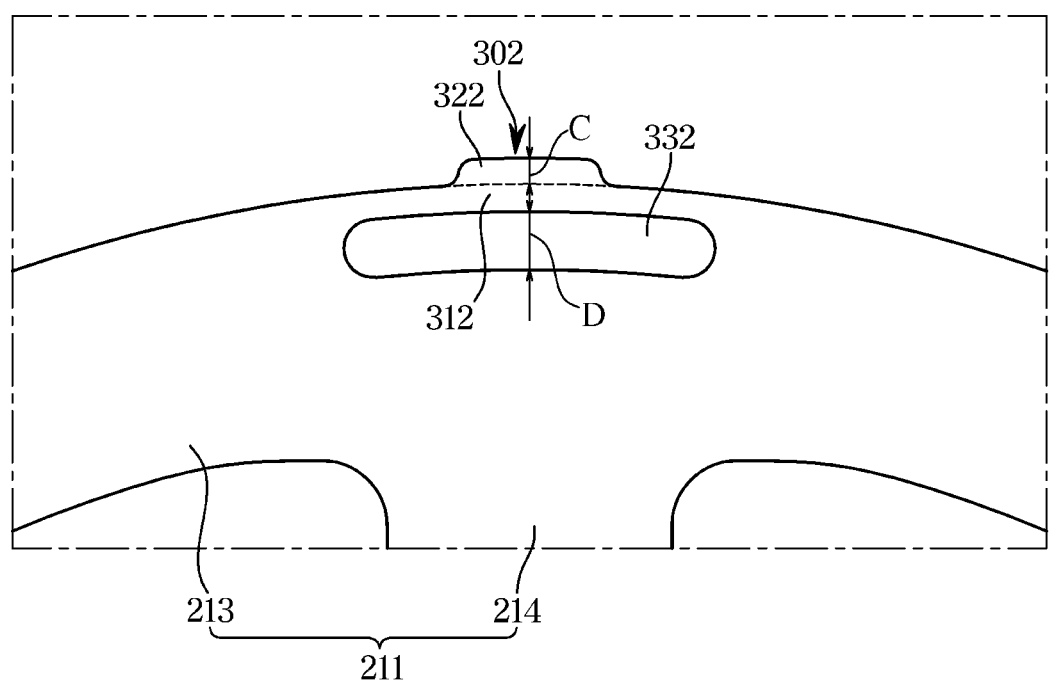
FIG. 10 is an enlarged plan view of a portion of a stator of a motor of a compressor according to another embodiment of the disclosure.
Figure 11:
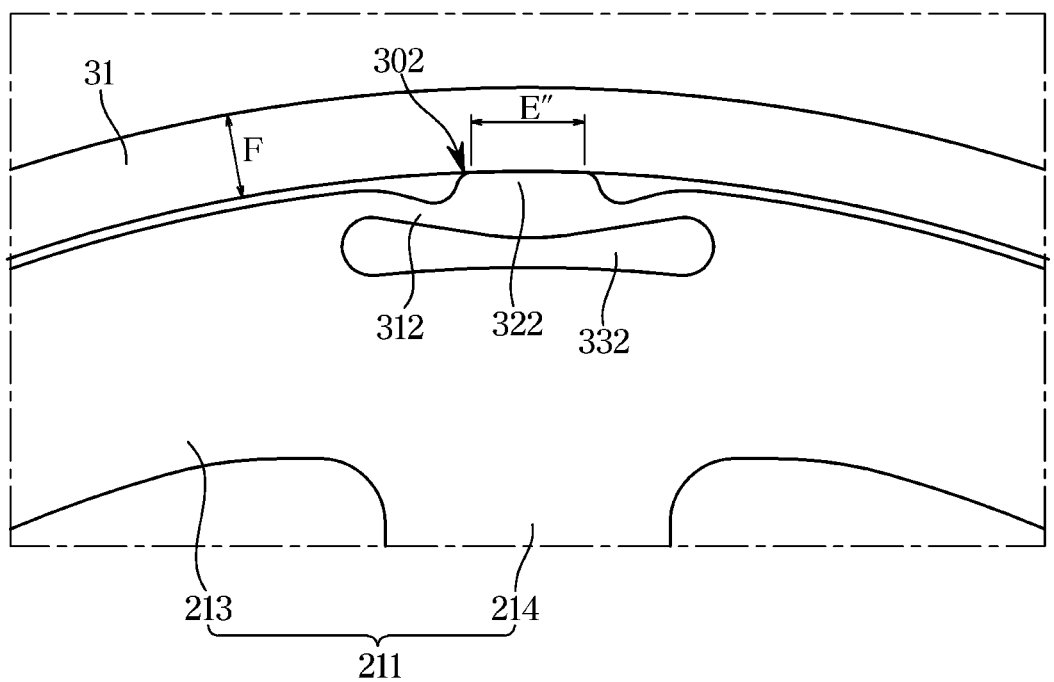
FIG. 11 is an enlarged plan view of a portion of a state in which the stator in FIG. 10 is coupled to a housing.

FIG. 10 is an enlarged plan view of a portion of a stator of a motor of a compressor according to another embodiment of the disclosure, and FIG. 11 is an enlarged plan view of a portion of a state in which the stator in FIG. 10 is coupled to a housing.

Referring to FIGS. 10 and 11, the core 211 of the stator 21 may include the annular back yoke 213 in contact with the housing 31, and the tooth 214 extending inward from the back yoke 213. The core 211 may include a plurality of the teeth 214 formed in the circumferential direction on the inner portion thereof facing the outer circumferential surface of the rotor 22. The coil 212 may be wound on the teeth 214 of the core 211.

The motor 20 may include a stress absorber 302 provided on the back yoke 213 of the core 211 of the stator 21. The stress absorber 302 may be provided on the side opposite to one side of the back yoke 213 from which the tooth 214 extends. The motor 20 may include a plurality of the stress absorbers 302 corresponding to the plurality of teeth 214.

The stress absorber 302 is configured to absorb a compressive stress transmitted from the housing 31 to the stator 21 by coupling with the housing 31. The stress absorber 302 may include a deformation portion 312, a contact portion 322, and a cavity 332. The deformation portion 312 is configured to be compressed and deformed by the housing 31 when the stator 21 is interference fitted into and coupled to the housing 31. The cavity 332 is formed in a radial inner side of the deformation portion 312 to provide a space in which the deformation portion 312 may be deformed.

The contact portion 322 protrudes radially outward from the deformation portion 312. The contact portion 322 is configured to come into contact with the inner surface of the housing 31 when the stator 21 is coupled to the housing 31. The housing 31 presses the contact portion 322 of the stator 21 when the motor 20 is interference fitted into and coupled to the housing 31. When the housing 31 presses the contact portion 322, the deformation portion 312 is deformed to the cavity 332 side together with the contact portion 322.

The contact portion 322 protrudes radially outward compared to the portion of the back yoke 213 where the stress absorber 302 is not formed, and the width C in which the contact portion 322 protrudes radially outward from the deformation portion 312 is larger than the difference between the outer radius A (see FIG. 2) of the stator 21 and the inner radius B (see FIG. 4) of the housing 31. Therefore, when the stator 211 is coupled to the housing 31, the housing 31 does not press other portion of the core 211 except for the stress absorber 302 of the stator 21.

The deformation portion 312 is deformed to the cavity 332 side by the difference between the outer radius A of the stator 21 and the inner radius B of the housing 31. The cavity 332 has the width D larger than the difference between the outer radius A of the stator 21 and the inner radius B of the housing 31. Therefore, even when the deformation portion 312 is deformed to the cavity 330 side, the deformation portion 312 does not press a portion of the back yoke 213 on a radial inner side of the cavity 332.

The contact portion 322 may protrude to have the width C sufficiently larger than the difference between the outer radius A of the stator 21 and the inner radius B of the housing 31. Therefore, even when a tolerance of the inner radius B of the housing 31 or a tolerance of the outer radius A of the stator 21 occurs, the housing 31 does not press other portion of the core 211 except for the stress absorber 302 of the stator 21.

The cavity 332 may have the sufficiently large radial width D compared to the protruding width C of the contact portion 322. Therefore, even when a tolerance of the protruding width C of the contact portion 322, a tolerance of the inner radius B of the housing 31, or a tolerance of the outer radius A of the stator 21 occurs, the deformation portion 312 does not press the portion of the back yoke 213 on the radial inner side of the cavity 332.

The deformation portion 312 may be formed in a cross beam shape. The cavity 332 may be provided such that a central portion of the deformation portion 312 is disposed at a central portion of the cavity 332. The deformation portion 312 may be disposed such that the center of the deformation portion 312 coincides with the center of the cavity 322. The contact portion 322 may be provided to protrude radially outward from the central portion of the deformation portion 312. The core 211 of the stator 21 may include a plurality of the stress absorbers 302 corresponding to the plurality of teeth 214. Each of the stress absorbers 302 may be disposed on a radial outer side of each of the teeth 214.

Each of the stress absorbers 302 may include the at least one deformation portion 312, the at least one contact portion 322, and the at least one cavity 332. The back yoke 213 may include one of the deformation portion 312, one of the contact portion 322, and one of the cavity 332, which are arranged such that centers thereof coincide with the center of each of the teeth 214 for each of the teeth 214.

The contact portion 322 may be formed to come into surface contact with the inner surface of the housing 31 when the deformation portion 312 is deformed. When the deformation portion 312 is formed in a fixed end support beam shape, the contact portion 322 may be formed to protrude higher toward a central portion.

A circumferential width of a contact surface in which the at least one contact portion 322 included in one of the stress absorber 302 is in contact with the housing 31 may be larger than the radial thickness F of the housing 31. When the circumferential width of the contact surface is large, the stator 21 may be more stably fixed to the inner surface of the housing 31. When one of the stress absorber 302 includes one of the contact portion 322, a circumferential width E" of the contact portion 322 and the contact surface of the housing 31 may be larger than the radial thickness F of the housing 31.

Figure 12:
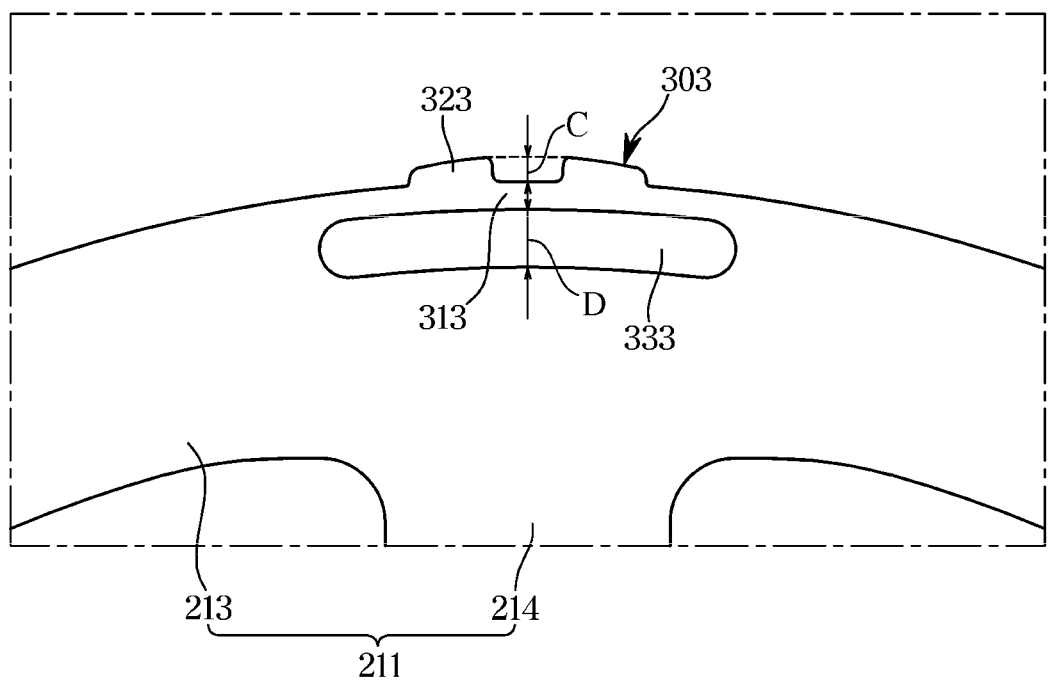
FIG. 12 is an enlarged plan view of a portion of a stator of a motor of a compressor according to another embodiment of the disclosure.
Figure 13:
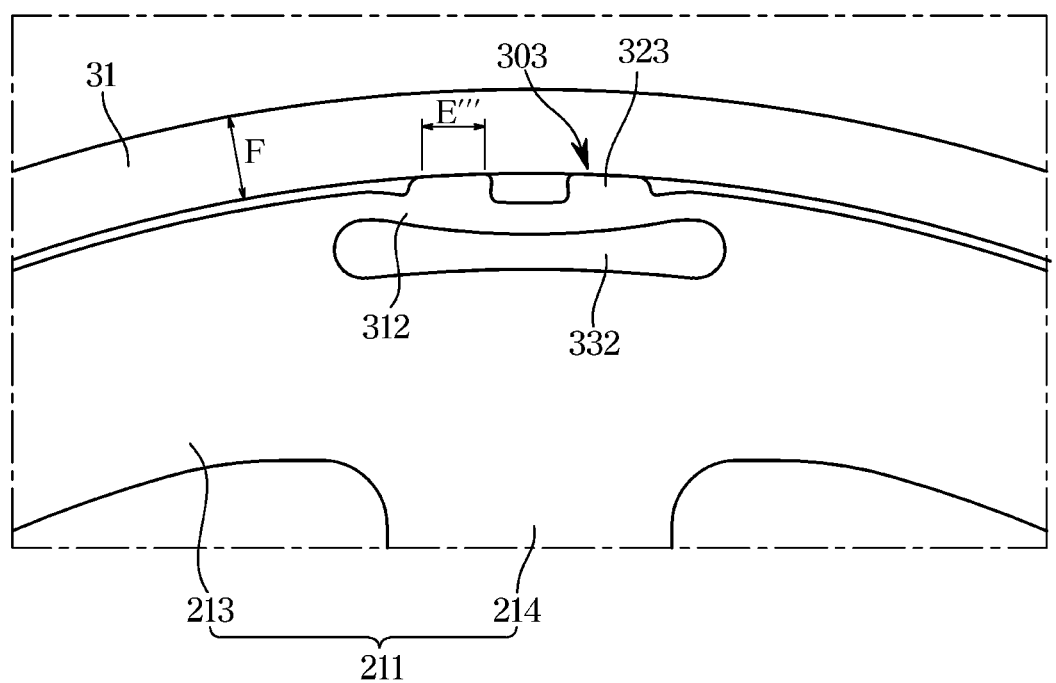
FIG. 13 is an enlarged plan view of a portion of a state in which the stator in FIG. 12 is coupled to a housing.

FIG. 12 is an enlarged plan view of a portion of a stator of a motor of a compressor according to another embodiment of the disclosure, and FIG. 13 is an enlarged plan view of a portion of a state in which the stator in FIG. 12 is coupled to a housing.

A deformation portion 313 may be formed in a cross beam shape. A cavity 333 may be provided such that a central portion of a deformation portion 313 is disposed at a central portion of the cavity 333. The deformation portion 313 may be disposed such that the center of the deformation portion 313 coincides with the center of the cavity 323. The contact portion 323 may be provided to protrude radially outward from the central portion of the deformation portion 313. The core 211 of the stator 21 may include a plurality of stress absorbers 303 corresponding to the plurality of teeth 214. Each of the stress absorbers 303 may be disposed on a radial outer side of each of the teeth 214.

Each of the stress absorbers 303 may include the at least one deformation portion 313, the at least one contact portion 323, and the at least one cavity 333. The back yoke 213 may include one of the deformation portion 313 and one of the cavity 333, which are arranged such that centers thereof coincide with the center of each of the teeth 214 for each of the teeth 214. The back yoke 213 may include a plurality of the contact portions 323 disposed symmetrically with respect to the center of the deformation portion 313.

The contact portion 323 may be formed to come into surface contact with the inner surface of the housing 31 when the deformation portion 313 is deformed. When the deformation portion 313 is formed in a fixed end support beam shape and the plurality of contact portions 323 is provided, the plurality of contact portions 323 may be formed to protrude higher toward a central portion of the deformation portion 313.

A circumferential width of a contact surface in which the at least one contact portion 323 included in one of the stress absorber 303 is in contact with the housing 31 may be larger than the radial thickness F of the housing 31. When the circumferential width of the contact surface is large, the stator 21 may be more stably fixed to the inner surface of the housing 31.

When one of the stress absorber 303 includes the plurality of contact portions 323, the sum of circumferential widths E" of the contact portions 323 and the contact surface of the housing 31 may be larger than the radial thickness F of the housing 31. That is, when two of the contact portions 323 are disposed with respect to the center of each of the teeth 214, each of the contact portions 323 may have a contact surface of the circumferential width E'" exceeding half of the radial thickness F of the housing 31.

Figure 14:
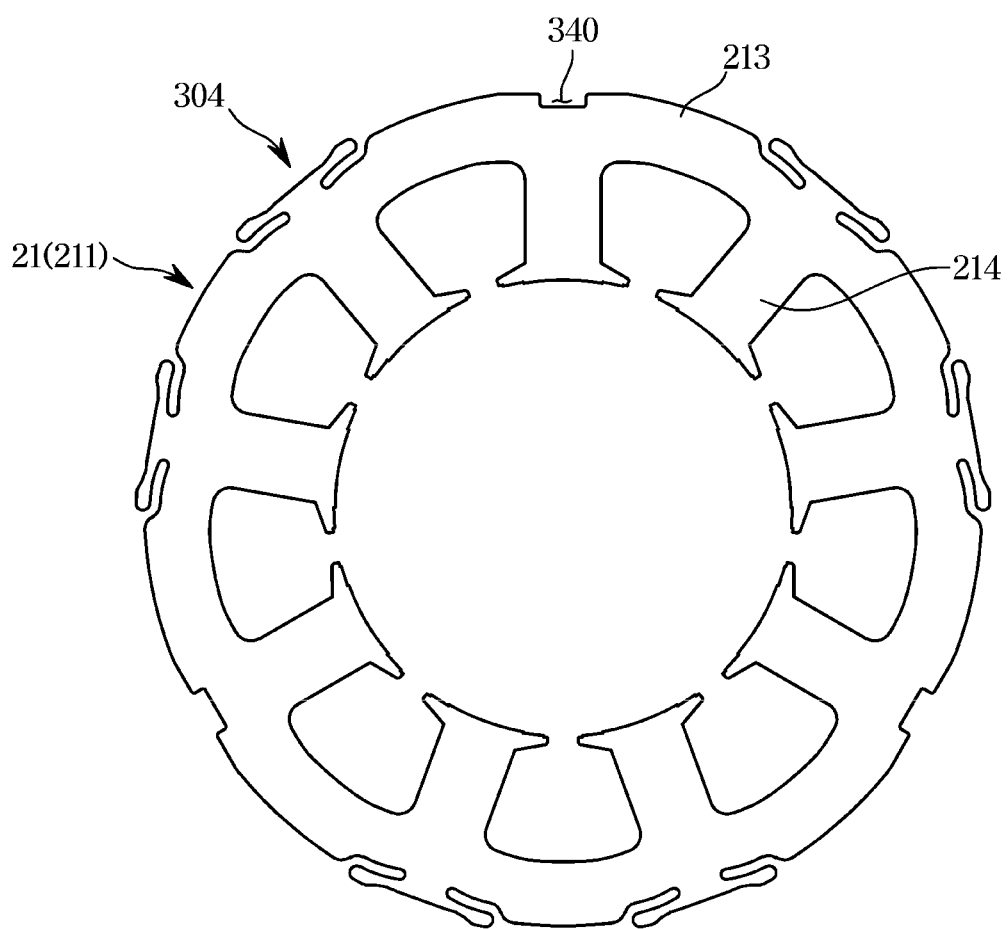
FIG. 14 is a plan view of a stator of a motor of a compressor according to another embodiment of the disclosure.

FIG. 14 is a plan view of a stator of a motor of a compressor according to another embodiment of the disclosure.

Referring to FIG. 14, the core 211 of the stator 21 may include the annular back yoke 213 in contact with the housing 31, and the tooth 214 extending inward from the back yoke 213. The core 211 may include a plurality of the teeth 214 formed in the circumferential direction on the inner portion thereof facing the outer circumferential surface of the rotor 22. The coil 212 may be wound on the teeth 214 of the core 211.

The motor 20 may include a stress absorber 304 provided on the back yoke 213 of the core 211 of the stator 21. The stress absorber 304 may be provided on the side opposite to one side of the back yoke 213 from which the tooth 214 extends. The motor 20 may include a plurality of the stress absorbers 304 corresponding to the plurality of teeth 214.

The function and structure of the stress absorber 304 have already been described, so a redundant description is omitted.

According to another embodiment of the disclosure, the number of the stress absorbers 304 may not correspond to the number of the teeth 214 of the back yoke 213. Specifically, the number of the stress absorbers 304 may be less than the number of the teeth 214 of the back yoke 213.

Referring to FIG. 14, the stator 21 may include a groove 340. The groove 340 may be formed on the tooth 214 on which the stress absorber 304 is not formed. According to another embodiment of the disclosure, the stator 21 may include three of the grooves 340. Two of the stress absorbers 304 may be provided between the respective grooves 340. Unlike illustrated in the drawing, the groove 340 may not be provided on the tooth 214 on which the stress absorber 304 is not provided. In this case, the back yoke 213 may be formed in an annular shape with no recessed portion on a radial inner side thereof.

The coupling force between the housing 31 and the stator 21 may relatively decrease due to the reduced number of the stress absorbers 304, but even if the stress absorber 304 is not provided on all the teeth 214, a sufficient coupling force for fixing the stator 21 may be provided on an inner side of the housing 31.

The drawing illustrates the stress absorber shown in FIGS. 2 to 4, but is not limited thereto. It is also applicable to the stator including the stress absorbers shown in FIGS. 5 to 13.

Figure 15:
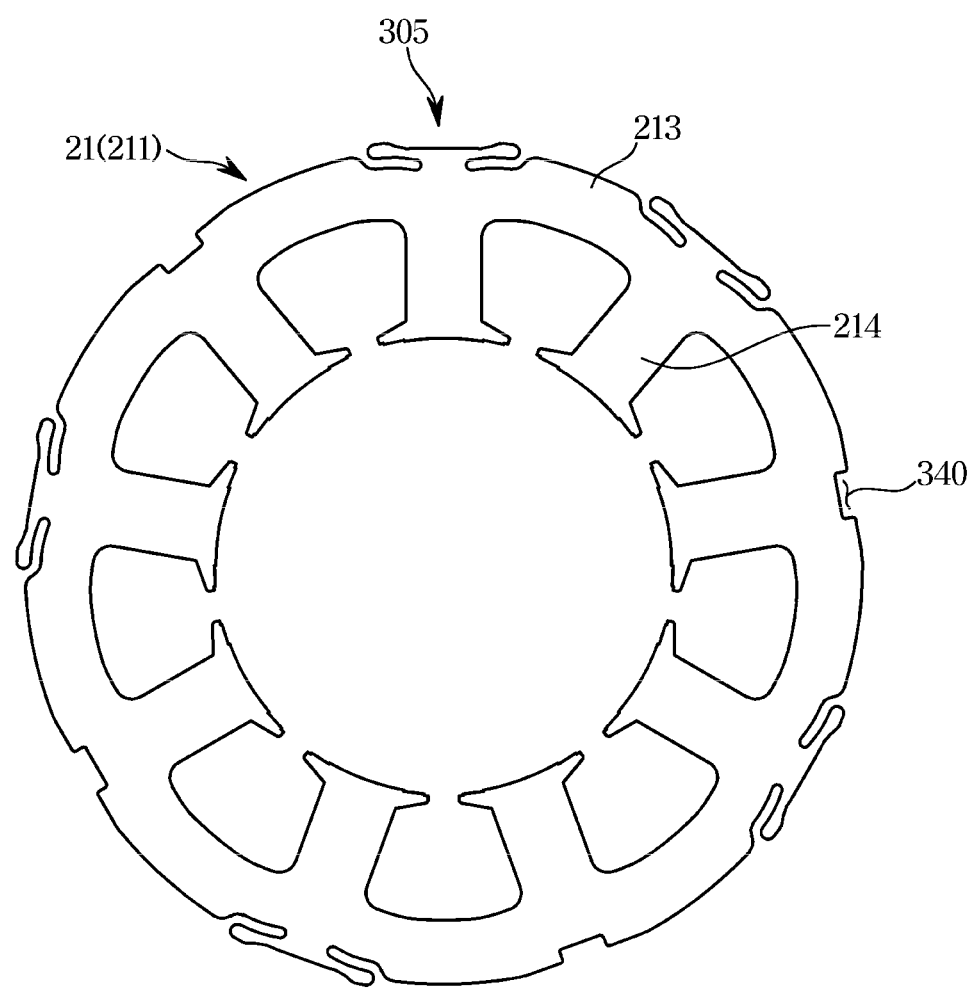
FIG. 15 is a plan view of a stator of a motor of a compressor according to another embodiment of the disclosure.

FIG. 15 is a plan view of a stator of a motor of a compressor according to another embodiment of the disclosure.

Referring to FIG. 15, the core 211 of the stator 21 may include the annular back yoke 213 in contact with the housing 31, and the tooth 214 extending inward from the back yoke 213. The core 211 may include a plurality of the teeth 214 formed in the circumferential direction on the inner portion thereof facing the outer circumferential surface of the rotor 22. The coil 212 may be wound on the teeth 214 of the core 211.

The motor 20 may include a stress absorber 305 provided on the back yoke 213 of the core 211 of the stator 21. The stress absorber 305 may be provided on the side opposite to one side of the back yoke 213 from which the tooth 214 extends. The motor 20 may include a plurality of the stress absorbers 305 corresponding to the plurality of teeth 214.

The function and structure of the stress absorber 305 have already been described, so a redundant description is omitted.

According to another embodiment of the disclosure, the number of the stress absorbers 305 may not correspond to the number of the teeth 214 of the back yoke 213. Specifically, the number of the stress absorbers 305 may be less than the number of the teeth 214 of the back yoke 213.

Referring to FIG. 15, the stator 21 may include a groove 340. The groove 340 may be formed on the tooth 214 on which the stress absorber 304 is not formed. According to another embodiment of the disclosure, the stator 21 may include four of the grooves 340. The stress absorber 305 and the groove 340 may be arranged alternately along the circumferential direction of the back yoke 213. FIG. 15 illustrates that among a total of the nine teeth, the stress absorber is formed on the five teeth and the groove is formed on the four teeth, but is not limited thereto. The number of grooves may be more than the number of stress absorbers, and the groove may not be formed on the tooth on which the stress absorber is not formed.

The coupling force between the housing 31 and the stator 21 may relatively decrease due to the reduced number of the stress absorbers 305, but even if the stress absorber 305 is not provided on all the teeth 214, a sufficient coupling force for fixing the stator 21 may be provided on the inner side of the housing 31.

The drawing illustrates the stress absorber shown in FIGS. 2 to 4, but is not limited thereto. It is also applicable to the stator including the stress absorbers shown in FIGS. 5 to 13.

Figure 16:
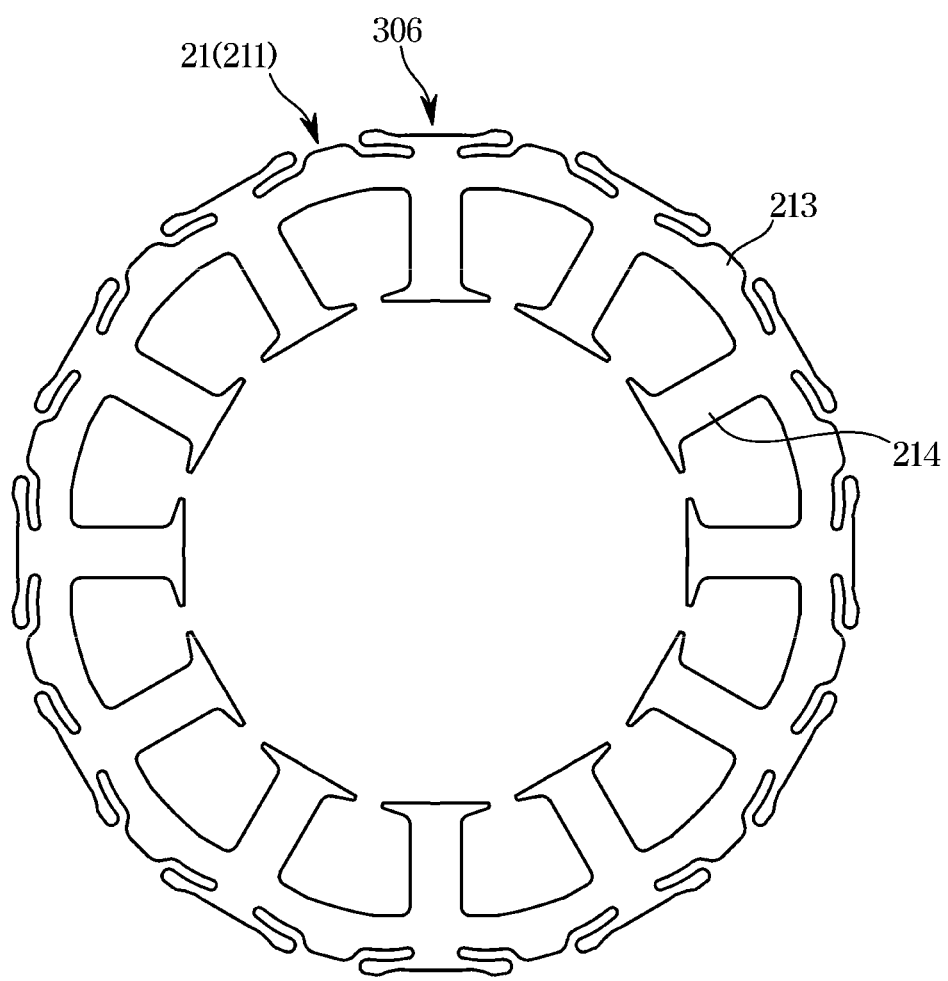
FIG. 16 is a plan view of a stator of a motor of a compressor according to another embodiment of the disclosure.

FIG. 16 is a plan view of a stator of a motor of a compressor according to another embodiment of the disclosure.

Referring to FIG. 16, a stator of a motor of a compressor according to another embodiment of the disclosure may include twelve of the teeth 214. Each of the twelve teeth 214 may include a stress absorber 306.

The drawing illustrates the stator including twelve teeth, but is not limited thereto. The number of teeth may be varied according to a design specification. In addition, the drawing illustrates the stress absorber shown in FIGS. 2 to 4, but is not limited thereto. The number of teeth may also be varied for the stators including the stress absorbers shown in FIGS. 5 to 13.

Figure 17:
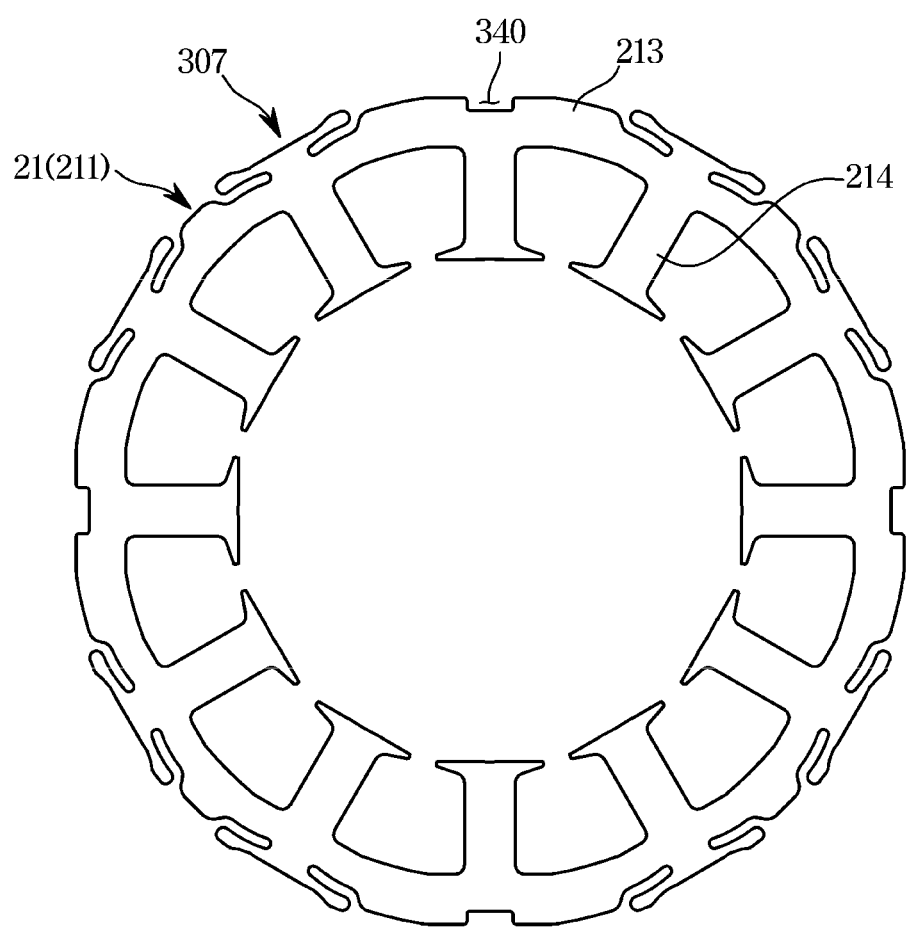
FIG. 17 is a plan view of a stator of a motor of a compressor according to another embodiment of the disclosure.

FIG. 17 is a plan view of a stator of a motor of a compressor according to another embodiment of the disclosure.

Referring to FIG. 17, a stator of a motor of a compressor according to another embodiment of the disclosure may include twelve of the teeth 214. Some of the twelve the teeth 214 may include a stress absorber 307, and the other may include the groove 340.

As illustrated in FIG. 17, the stator 21 may include four of the grooves 340. The grooves 340 may be provided at the up, down, left, and right sides of the stator 21 in the drawing, respectively. That is, the grooves 340 may be arranged every 90 degrees along the circumferential direction of the back yoke 213. Two of the stress absorbers 307 may be disposed between the groove 340 and the groove 340. The groove 340 and the groove 340 may be arranged to face each other based on the center of the back yoke 213. The stress absorber 307 and the stress absorber 307 may be arranged to face each other based on the center of the back yoke 213. In other words, the groove 340 and the stress absorber 307 may be arranged symmetrically.

The coupling force between the housing 31 and the stator 21 may relatively decrease due to the reduced number of the stress absorbers 307, but even if the stress absorber 307 is not provided on all the teeth 214, a sufficient coupling force for fixing the stator 21 may be provided on the inner side of the housing 31.

The drawing illustrates the stress absorber shown in FIGS. 2 to 4, but is not limited thereto. It is also applicable to the stator including the stress absorbers shown in FIGS. 5 to 13.

Figure 18:
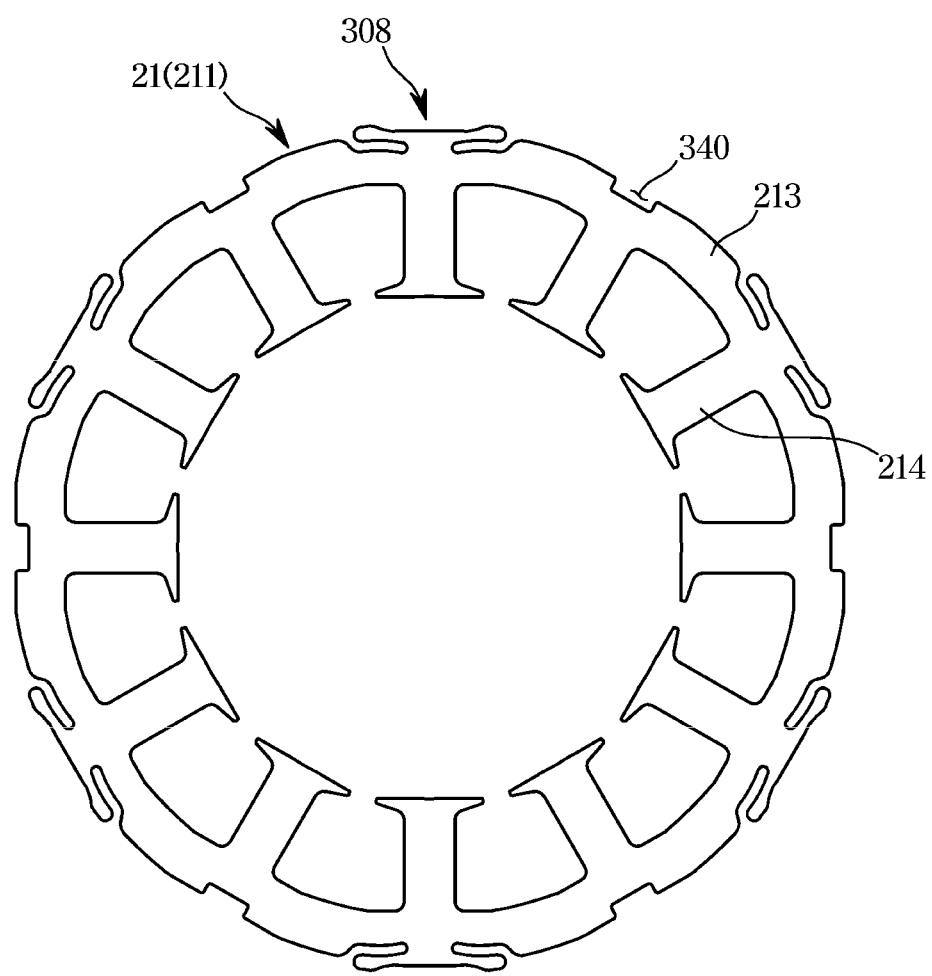
FIG. 18 is a plan view of a stator of a motor of a compressor according to another embodiment of the disclosure.

FIG. 18 is a plan view of a stator of a motor of a compressor according to another embodiment of the disclosure.

Referring to FIG. 18, a stator of a motor of a compressor according to another embodiment of the disclosure may include twelve of the teeth 214. Some of the twelve teeth 214 may include a stress absorber 308, and the other may include the groove 340.

As illustrated in FIG. 18, the stator 21 may include six of the grooves 340. The groove 340 and the stress absorber 308 may be arranged alternately along the circumferential direction of the back yoke 213. The stress absorber 308 may be disposed between the groove 340 and the groove 340. The groove 340 may be disposed between the stress absorber 308 and the stress absorber 308. Also, the groove 340 and the groove 340 may be arranged to face each other based on the center of the back yoke 213. Likewise, the stress absorber 308 and the stress absorber 308 may be arranged to face each other based on the center of the back yoke 213. In other words, the groove 340 and the stress absorber 308 may be arranged symmetrically.

The coupling force between the housing 31 and the stator 21 may relatively decrease due to the reduced number of the stress absorbers 308, but even if the stress absorber 308 is not provided on all the teeth 214, a sufficient coupling force for fixing the stator 21 may be provided on the inner side of the housing 31.

The drawing illustrates the stress absorber shown in FIGS. 2 to 4, but is not limited thereto. It is also applicable to the stator including the stress absorbers shown in FIGS. 5 to 13.

The stator may include various forms of stress absorbers and grooves not shown in the drawings. In a case where the stress absorber is not formed on all of the teeth of the stator, the groove may be provided in various positions and numbers. As described above, the groove may not be provided on the tooth on which the stress absorber is not formed.

In the above, the motor 20 in which the rotor 22 is disposed at the inner side of the stator 21 has been described, but the embodiments of the disclosure may also be applied to an external rotor motor in which a rotor is disposed at an outer side of a stator.

The stator of the motor may include an annular back yoke and a plurality of teeth extending from the back yoke. The motor may include a plurality of stress absorbers capable of absorbing an external force for fixing the stator. The stress absorber may be provided on the side opposite to one side of the back yoke from which the tooth extends.

The stress absorber may include a deformation portion, a cavity, and a contact portion. The deformation portion may be configured to be compressed and deformed by an external force. The cavity may be configured to provide a space in which the deformation portion may be deformed. The contact portion protrudes from the side opposite to the one side on which the cavity is disposed and may be configured to press the deformation portion by an external force. The contact portion may be disposed at a central portion of the cavity.

The motor may include the plurality of stress absorbers having a number corresponding to a plurality of teeth, and each of the plurality of stress absorbers may include the at least one deformation portion, the at least one contact portion, and the at least one cavity. The deformation portion may be formed in the form of a cantilever shape or a fixed end support beam shape.

As is apparent from the above, according to the disclosure, a compressive stress occurring on a stator of a motor is reduced by a housing of a compressor, so that the efficiency of the motor can be improved.

While the disclosure has been particularly described with reference to exemplary embodiments, it should be understood by those of skilled in the art that various changes in form and details may be made without departing from the spirit and scope of the disclosure.

What is claimed is:

1. A compressor comprising:
   a housing; and
   a motor including:
   a stator configured to be interference fitted into and fixed to an inner circumferential surface of the housing, the stator including an annular back yoke, a plurality of teeth extending radially inward from the annular back yoke, and a coil wound on the plurality of teeth, and
   a rotor configured to be rotatable inside the stator,
   wherein the annular back yoke comprises:
   two cantilevers extending opposite to each other in a circumferential direction of the annular back yoke from a center of each of the plurality of teeth; and
   two cavities formed on a radial inner side of the two cantilevers into which the two cantilevers are deformed,
   wherein each of the two cantilevers comprises:
   a deformation portion pressed and bent by the housing while the stator is interference fitted into the inner circumferential surface of the housing; and
   a contact portion which protrudes radially outward from the deformation portion and being in contact with the housing while the stator is interference fitted into the inner circumferential surface of the housing.

2. The compressor according to claim 1, wherein the contact portion is formed on an end of each of the two cantilevers.

3. The compressor according to claim 2, wherein the two cantilevers and the cavities are arranged symmetrically with respect to a center of each of the plurality of teeth.

4. The compressor according to claim 1, wherein the cavity has a width in a radial direction of the annular back yoke larger than a width of the contact portion protruding radially outward from deformation.

5. The compressor according to claim 1, wherein the contact portion has a circumferential width larger than a thickness of the housing.

* * * * *